United States Patent
Ramadas et al.

(10) Patent No.: US 8,756,977 B2
(45) Date of Patent: Jun. 24, 2014

(54) DEVELOPMENTS IN OR RELATING TO A CONDENSATE RECOVERY SYSTEM

(75) Inventors: Nishal Ramadas, Glasgow (GB); Richard Quentin Carmichael, Huntley Gloucestershire (GB); Christopher Michael Roland Agard Poczka, Cheltenham (GB)

(73) Assignee: Spirax-Sarco Limited, Cheltenham Gloucestershire (GB)

( * ) Notice: Subject to any disclaimer, the term of this patent is extended or adjusted under 35 U.S.C. 154(b) by 717 days.

(21) Appl. No.: 12/919,990

(22) PCT Filed: Feb. 27, 2009

(86) PCT No.: PCT/GB2009/000565
§ 371 (c)(1),
(2), (4) Date: May 13, 2011

(87) PCT Pub. No.: WO2009/106851
PCT Pub. Date: Sep. 3, 2009

(65) Prior Publication Data
US 2011/0203684 A1 Aug. 25, 2011

(30) Foreign Application Priority Data
Feb. 28, 2008 (GB) .................................. 0803698.0

(51) Int. Cl.
*G01M 3/28* (2006.01)
*G06F 11/30* (2006.01)

(52) U.S. Cl.
USPC ........................... 73/40.5 A; 702/54; 702/183

(58) Field of Classification Search
USPC ................... 73/49.1, 592, 593, 865.8, 40.5 A; 137/544; 702/51, 54, 182, 183, 185
See application file for complete search history.

(56) References Cited

U.S. PATENT DOCUMENTS

| | | | |
|---|---|---|---|
| 5,101,774 A * | 4/1992 | Marziale et al. | 122/504.2 |
| 6,145,529 A * | 11/2000 | Hellman et al. | 137/1 |
| 6,338,283 B1 * | 1/2002 | Blazquez Navarro et al. | 73/865.8 |
| 6,675,665 B2 * | 1/2004 | Blazquez Navarro et al. | 73/865.8 |
| 7,203,626 B2 * | 4/2007 | Quake et al. | 702/189 |
| 7,246,036 B2 * | 7/2007 | Cheskaty et al. | 702/183 |
| 7,290,450 B2 * | 11/2007 | Brown et al. | 73/579 |
| 7,664,610 B2 * | 2/2010 | Anderson et al. | 702/51 |

(Continued)

FOREIGN PATENT DOCUMENTS

JP 02141637 A 5/1990

OTHER PUBLICATIONS

Daniher, Derek et al. "End-point detection in high-shear granulation using sound and vibration signal analysis." Powder Technology, v. 181 (2008) pp. 130-136.*

(Continued)

*Primary Examiner* — Peter MacChiarolo
*Assistant Examiner* — Natalie Huls
(74) *Attorney, Agent, or Firm* — Banner & Witcoff, Ltd.

(57) ABSTRACT

A condensate recovery system may comprise a plurality of drain lines for draining condensate from an associated steam plant. Each drain line may incorporate a steam trap and feeds into a common condensate return line running between the drain lines and a condensate receiver tank. The system further may comprise an acoustic sensor positioned along the common condensate return line, upstream of the receiver tank, for providing an acoustic output indicative of the collective steam loss through steam traps upstream of the sensor.

18 Claims, 3 Drawing Sheets

(56) References Cited

U.S. PATENT DOCUMENTS

| | | | |
|---|---|---|---|
| 7,702,484 B2 * | 4/2010 | Armstrong et al. | 702/183 |
| 7,912,675 B2 * | 3/2011 | Quake et al. | 702/182 |
| 2002/0124666 A1 | 9/2002 | Navarro et al. | |
| 2004/0024544 A1 * | 2/2004 | Guebert et al. | 702/33 |
| 2006/0118648 A1 | 6/2006 | Armstrong et al. | |
| 2010/0153068 A1 * | 6/2010 | Armstrong et al. | 702/183 |
| 2011/0100488 A1 * | 5/2011 | Somrah | 137/544 |
| 2011/0316707 A1 * | 12/2011 | Gaines et al. | 340/632 |
| 2013/0167619 A1 * | 7/2013 | Spasova | 73/40.5 A |

OTHER PUBLICATIONS

International Preliminary Report on Patentability in related International Patent Application No. PCT/GB2009/000565, mailed Sep. 10, 2010.

International Search Report and Written Opinion mailed Jun. 10, 2009 (PCT/GB2009/000565): ISA/EP.

Anonymous: "Guide Books: Book—2: Energy Efficiency in Thermal Utilities, Chapter 3: Steam System" [Online] May 15, 2006, The National Certificate Examination for Energy Managers and Energy Auditors, XP002525110 Retrieved from the Internet: URL: http://web.archive,org/web/20060515185835/www.em-ea.org/Guide+Books/book-2/2.3+S team+distribution+&utilisation.pdf> [retrieved on Apr. 23, 2009].

Willis, Tracy; Dimmick, J.: "Maintaining a successful Valve and Trap Leak Detection Program Using the ValveAlyzer System" 10th Annual Predictive Maintenance Technology National Conference, [Online] Nov. 12, 1998, pp. 1-34, XP002525111 Retrieved from the Internet: URL:http://www.leakdetect.com/files/Indiana.pdf>.

Thomas C. Rockwell: "Steam trap testing yields energy savings" Chemical Processing, Jan. 1995, pp. 1-4, XP009115793.

Search Report completed May 14, 2008 (GB0803698.0).

* cited by examiner

DEVELOPMENTS IN OR RELATING TO A CONDENSATE RECOVERY SYSTEM

CROSS-REFERENCE TO RELATED APPLICATIONS

The present application is a U.S. National Phase filing of International Application No. PCT/GB2009/000565, filed Feb. 27, 2009, which claims priority to United Kingdom Patent Application No. 0803698.0, filed Feb. 28, 2008, both of which the present application claims priority to and the benefit of, and both of which are incorporated by reference herein in their entireties.

BACKGROUND

Aspects of the invention relates to condensate recovery systems and methods for recovering condensate from a steam plant. Further systems and methods relate to monitoring steam loss in such a condensate recovery system, and in particular certain embodiments may be implemented for optimising the scheduling of a steam trap maintenance survey.

It is well known to provide a steam plant for generating and distributing useful energy, in the form of steam, to the point-of-use in various industrial applications.

In many systems, condensate is typically drained from the lowest points of the main plant pipeline through one or more drain-lines. In order to limit steam loss from the plant, each drain line is provided with a respective steam trap, which ideally operates to drain condensate whilst at the same time preventing the escape of "live" steam.

Whilst the presence of condensate in the main plant pipeline is undesirable, the hot condensate will nevertheless contain useful energy and therefore in a typical steam plant the drain-lines and steam traps will form part of a larger condensate recovery system designed to drain condensate (but ideally not live steam) from the main plant and to recycle the drained condensate through a down-stream boiler for subsequent use in the plant. Thus, each drain-line will typically feed into a condensate return line that in turn feeds one or more down-stream receiver tanks The receiver tanks act as temporary storage units for drained condensate, which is then typically pumped from the receiver tank into the feed-tank of a downstream boiler as required.

Efficient operation of the steam plant and condensate recovery system relies upon effective operation of the steam traps, and therefore the checking and maintenance of steam traps is very important. Conventionally, a detailed manual maintenance survey of steam traps will be carried out to identify faulty steam traps, possibly as part of a larger system audit. Current practice is to carry out such steam trap surveys periodically. However, a steam trap survey is normally a rigorous, tedious and often time-consuming process, and therefore surveys are only typically carried out at periodic intervals of six to twelve months; thus, in a worst case scenario it might be six months or more before a faulty steam trap is properly diagnosed in a maintenance survey.

Given the large number of traps associated with a steam plant, significant numbers of traps could in principle become faulty in the intervening period between maintenance surveys.

SUMMARY

The following presents a general summary of aspects of the invention in order to provide a basic understanding of the invention and various features of it. This summary is not intended to limit the scope of the invention in any way, but it simply provides a general overview and context for a more detailed description of various embodiments that follows.

Aspects of the invention relate to a condensate recovery system comprising a plurality of drain lines for draining condensate from an associated steam plant, each drain line incorporating a steam trap and feeding into a common condensate return line running between the drain lines and a condensate receiver tank, the system further comprising an acoustic sensor positioned along the common condensate return line, upstream of the receiver tank, for providing an acoustic output indicative of the collective steam loss through any of said steam traps which are upstream of the sensor.

It is envisaged that it will be possible to monitor steam loss in such a condensate recovery system by monitoring and analysing the acoustic output of each acoustic sensor on the basis of a pre-determined relationship between the acoustic output of the acoustic sensor and the combined amount of steam passing through the respective steam traps. The analysis of the acoustic output may include comparison of the value of a parameter of the acoustic output with a pre-determined maximum threshold value for that parameter determined on the basis of said pre-determined relationship. The parameter may be a spectral parameter. If the value of the parameter exceeds the maximum threshold value for the parameter, an alarm signal may be generated for triggering a maintenance survey.

It is further envisaged that such monitoring of the steam loss in the condensate recovery system will allow for optimising the scheduling of steam trap maintenance surveys and consequent steam trap repair or replacement, thereby increasing steam plant efficiency. Thus a method of scheduling a maintenance survey of two or more steam traps in such a condensate recovery system comprises monitoring and analysing the acoustic output on the basis of a pre-determined relationship and using the result of said analysis to determine whether to schedule a maintenance survey of those traps upstream of the sensor.

The condensate recovery system may comprise a plurality of acoustic sensors, each one of said sensors being positioned downstream from two or more of the steam traps. Alternatively, an acoustic sensor may be positioned downstream from all of the steam traps.

In one embodiment, the acoustic sensor is positioned in proximity to an inlet of the condensate receiver tank.

The condensate recovery system may comprise a central processor for analysing the acoustic output of each acoustic sensor, wherein each acoustic sensor is operably connected to a transmitter for transmitting said acoustic output to a respective receiver operably connected to the central processor.

The condensate recovery system may comprise a remote memory for storing data derived from the acoustic output for subsequent retrieval and analysis, wherein each acoustic sensor is operably connected to a transmitter for transmitting said acoustic output to a respective receiver operably connected to the memory.

Monitoring the acoustic output of each acoustic sensor may comprise transmitting the acoustic output of each of the acoustic sensors to a central processor, and analysing the acoustic output may comprise using said central processor to carry out an analysis of the acoustic output for each acoustic sensor on the basis of said pre-determined relationship.

Embodiments of the invention will now be described, by way of example, with reference to the accompanying drawings, in which.

Figure 1:
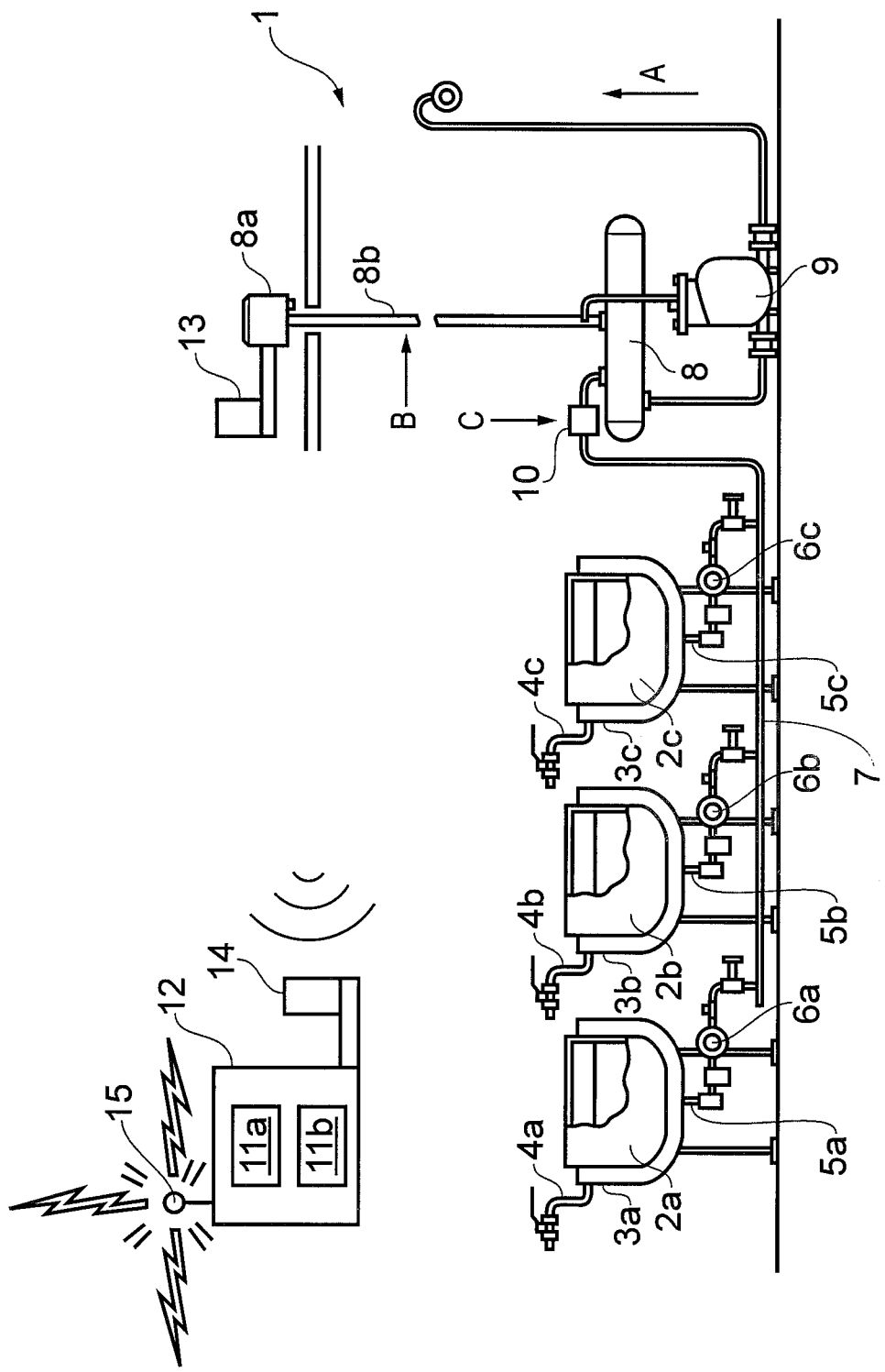
FIG. 1 is a schematic view of a condensate recovery system for an associated steam plant.

Referring to FIG. 1, an illustrative industrial unit is shown schematically, comprising steam utilizing equipment represented by three process vessels 2a, 2b, 2c having heating jackets 3a, 3b, 3c supplied with steam through inlets 4a, 4b, 4c. A condensate recovery system 1 comprises a plurality of drain lines, in this case three drain lines 5a, 5b, 5c, for draining condensate from the associated heating jacket 3a, 3b, 3c. The drain lines 5a, 5b, 5d each run between the respective heating jacket 3a, 3b, 3c and a common condensate return line 7 that feeds into a downstream receiver tank 8. Thus, during operation of the process vessels 2a, 2b, 2c, condensate will drain through the drain lines 5a, 5b, 5c, into the common condensate return line 7 and onto the receiver tank 8, where it may be stored temporarily before being raised to a condensate return main (not shown) by a pump 9, and subsequently fed into the feed tank of a downstream boiler (not shown) for subsequent recycling (as steam) through the plant.

To limit the loss of "live steam" from illustrative condensate recovery system 1, as the condensate is drained through the drain lines 5a, 5b, 5c, each of the drain lines 5a, 5b, 5c may incorporate a respective steam trap 6a, 6b, 6c. The steam traps 6a, 6b, 6c could each be any suitable conventional steam trap, selected in accordance with system conditions and desired trap characteristics.

Ideally, the steam traps 6a, 6b and 6c will act to trap steam loss from illustrative condensate recovery system 1, such that to prevent a significant loss of steam into the condensate recovery line 7. Therefore, in accordance with certain embodiments, condensate recovery line 7 and receiver tank 8 should only contain only hot condensate. However, mechanical defects and/or operation errors may result in the loss of steam from steam recovery system 1. For example, if one or more of the steam traps 6a, 6b, 6c develops a leak or fails 'open', steam will enter the condensate recovery line 7 and the receiver tank 8. This steam must be vented, for example, from the receiver tank 8. In one embodiment, receiver tank 8 may be provided with a conventional vent 8a at the end of an exhaust pipe 8b for this purpose. It will be appreciated that steam vented through the vent 8a escapes the steam/condensate loop of illustrative steam recovery system 1 altogether; the energy contained in this steam is therefore 'lost'.

It has been found, unexpectedly, that, for a typical condensate recovery system, there is a correlation between steam levels and acoustic noise levels in the condensate return line.

The finding is based on development work undertaken to record acoustic noise levels at various points in a test system.

In this regard, systems and methods disclosed herein may be utilized to correlate steam levels in existing condensate return lines of various closed systems. Example 1, disclosed below, briefly describes testing procedures conducting in accordance with various embodiments.

EXAMPLE 1

The test system corresponded essentially to a typical condensate recovery system except that in order to simulate and control steam leakage in the system a control-valve was installed for selectively by-passing a given steam trap.

Acoustic recordings were taken using a known data acquisition system (DAQ) incorporating a model UP100 acoustic sensor manufactured by UE Systems Inc., Elmsford N.Y. 10523 USA. At each test location for the sensor, the recordings were repeated for different positions of the by-pass valve: fully closed, quarter-open, half-open, three-quarter-open and fully open.

Figure 2:
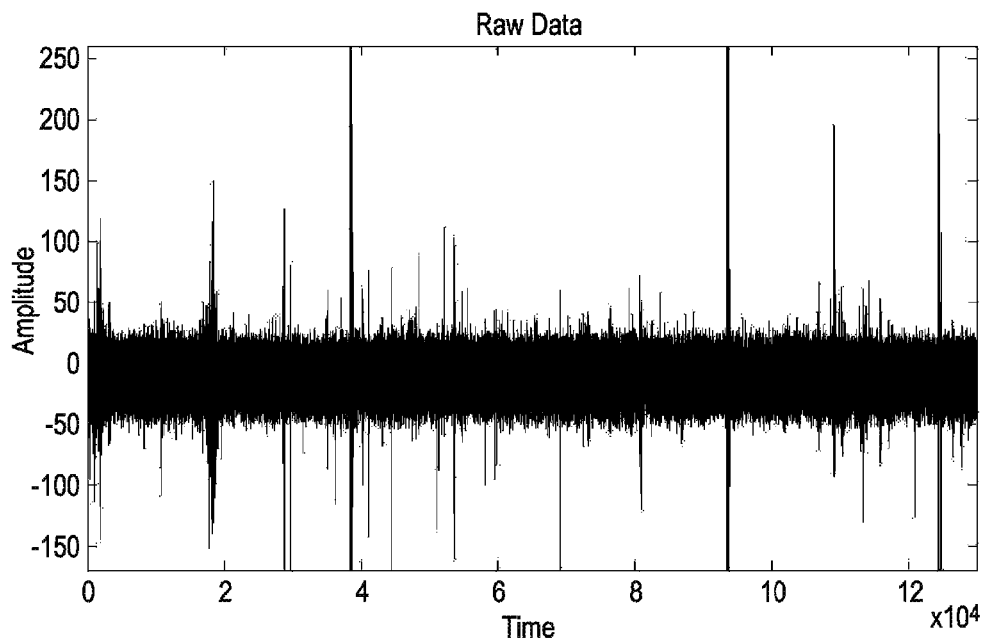
FIG. 2 is a graphical representation of the acoustic output from an acoustic sensor positioned on the exhaust pipe of a receiver tank.
Figure 3:
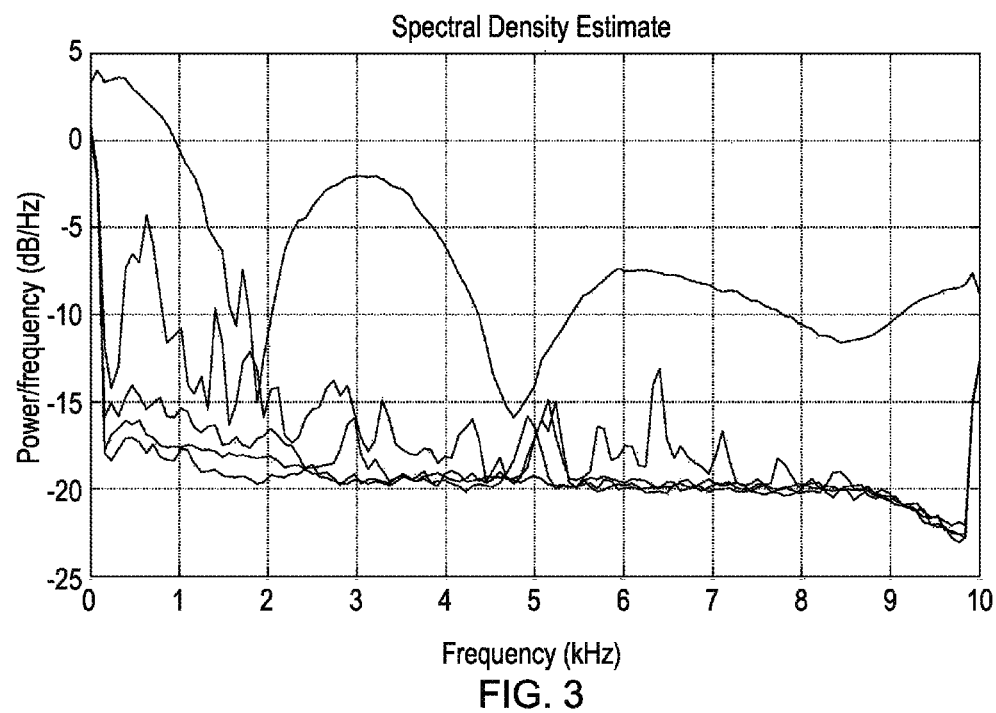
FIG. 3 is a graphical representation of various power spectra derived from the acoustic output shown in FIG. 2.

FIG. 2 shows the raw acoustic noise data captured at the exhaust pipe 4b of the receiver tank in the test system, that is, corresponding to the general position B in the condensate recovery system 1 (see FIG. 1). The corresponding five power spectra for each of the five separate positions of the by-pass valve, estimated from the raw acoustic data, are shown in FIG. 3. In each case, the power spectral density (PSD) has been estimated using Welch's Method, with the modified periodogram being calculated by applying a Hamming window to eight different segments of the respective acoustic signal, utilising a 50% overlap between individual segments.

Referring to FIG. 3, there is no strong correlation between the collective upstream steam loss in the system and the acoustic output of a sensor positioned at the exhaust pipe of a receiver tank.

Figure 4:
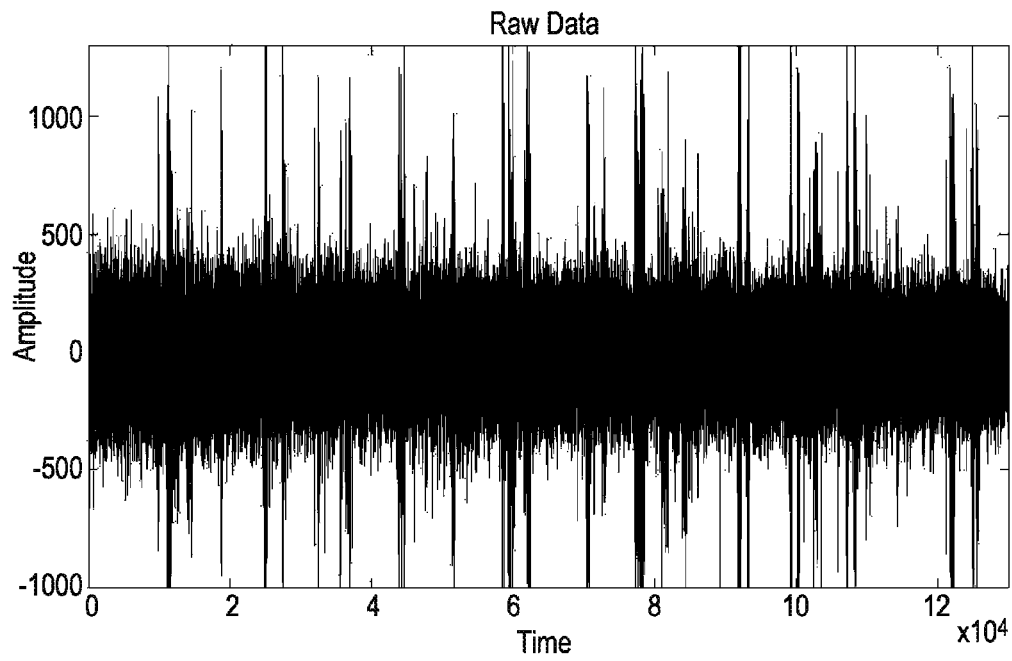
FIG. 4 is a graphical representation of the acoustic output from an acoustic sensor positioned as the inlet of a receiver tank.

Tests show that the result is different, however, upstream of a receiver tank. Thus, FIG. 4 shows the raw acoustic noise data captured at the inlet of a receiver tank, corresponding generally to the position C in FIG. 1 for the condensate recovery system 1, whilst FIG. 5 shows the corresponding power spectra, again with the PSD having been estimated using Welch's Method in a similar manner as before.

Figure 5:
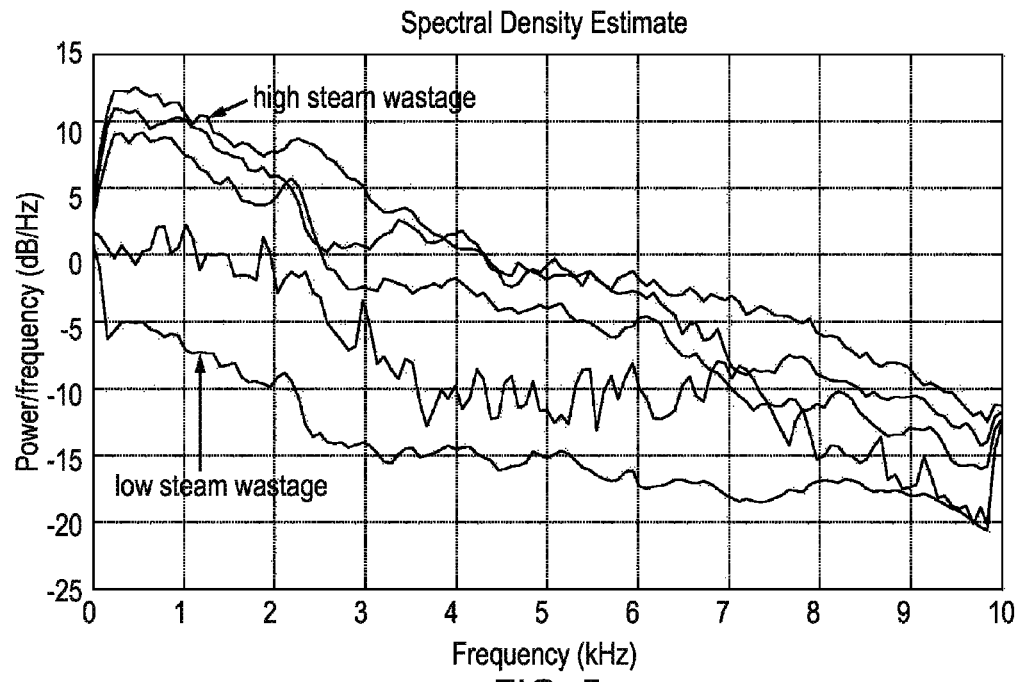
FIG. 5 is a graphical representation of various power spectra derived from the acoustic output shown in FIG. 4.

FIG. 5 demonstrates that in close proximity to the inlet of the receiver tank there is, surprisingly, a relationship or "correlation" between upstream steam loss (effectively representing the collective steam loss through every steam trap which is upstream of the sensor) and the corresponding acoustic signal generated by the acoustic sensor, specifically the PSD function of the acoustic signal. The correlation is all the more surprising given the apparent lack of correlation between upstream steam loss and acoustic noise in other parts of the condensate recovery system such as the exhaust pipe of the receiver tank.

Given this correlation between the upstream steam loss and the acoustic output of the sensor positioned upstream of a receiver tank, one or more parameters of the acoustic output can effectively be used as a "metric" indicative of collective upstream steam loss. Therefore, by positioning an acoustic sensor upstream of a receiver tank, such as receiver tank 8 in illustrative condensate recovery system 1, the acoustic output of the sensor can be used as a basis for estimating the collective steam loss upstream of the sensor. In one embodiment, a sensor may be placed proximate to a receiver tank inlet, such as receiver tank 8. Therefore, in accordance with aspects disclosed herein, collective upstream steam loss may be detected or measured in a condensate recovery system by monitoring and analysing the acoustic output of the acoustic sensor on the basis of a pre-determined relationship between the acoustic output and the collective upstream steam loss.

The acoustic output of the sensor might be analysed on the basis of a pre-determined relationship between the acoustic output and the collective upstream steam loss in various ways.

The analysis might be essentially quantitative: for example, the analysis could involve a comparative analysis of one or more suitable parameters of the acoustic output with a respective pre-determined threshold value for the or each parameter, the threshold value having been pre-determined to correspond to an unacceptable level of upstream steam loss, for example a "trigger" level for a more detailed maintenance survey.

Alternatively, the analysis might be pseudo-qualitative rather than strictly quantitative: for example, the analysis might involve visual or even aural comparisons of the acoustic output signal, or a signal derived from the acoustic output such as the corresponding power spectrum, with a corresponding pre-determined trace known to correspond to particular upstream steam loss conditions. Such a visual comparison might, for example, be carried out by an experienced maintenance engineer as part of a cost-benefit evaluation of the need for a detailed maintenance survey.

In either case, some or all steps of the analysis of the acoustic signal may be carried out in-situ at the acoustic sensor or, alternatively, remote from the acoustic sensor if preferred.

In the case of in-situ analysis, if the analysis is automated or partially automated this might be carried out using suitable, one or more "on-board" signal processing electronics, for example using a Digital Signal Processor. Alternatively or additionally, for example in the case of "human analysis" of the acoustic output, the sensor may be provided with an external communications interface for allow data access by an authorised user at the sensor location, for example using a hand-held device communicating with the sensor through the external communications interface.

In the case of remote analysis, data derived from the acoustic output may optionally be transmitted directly or indirectly to a remote "central" processor for automated analysis. The central processor may form part of a remote terminal, for example a terminal forming part of a computer network associated with the steam plant.

Additionally or alternatively, data derived from the acoustic output may be transmitted to a remote memory for subsequent analysis at a remote location. Again, such subsequent remote analysis might be automated, in which case the memory is operably connected to the processor, or the subsequent analysis may involve accessing data in the memory as part of a "human analysis", for example a pseudo-qualitative comparative analysis of the acoustic signal with a pre-determined signal.

Any data may be transmitted wirelessly, or at least partially wirelessly, between the sensor and the processor, or the sensor and the memory.

Thus, referring back to FIG. 1 in particular, the condensate recovery system 1 is provided with an acoustic sensor 10, permanently clamped at the general position C i.e. in proximity to the inlet of the receiver tank. The sensor 10 is wirelessly connected to a processor 11a and memory 11b in a remote terminal 12 (the remote terminal 12, memory 11b and processor 11a are shown only very schematically in FIG. 1) via a transmitter 13, operably connected with the sensor 10, and a respective receiver 14 operably connected to the processor 11a and memory 11b.

In use of the condensate recovery system 1 to monitor steam loss, the acoustic sensor 10 may generate an acoustic output continuously or intermittently. In any event, this acoustic output may be transmitted to the processor 11a via the transmitter 13 and receiver 14. Computer executable instructions, such as may be stored on computer-readable medium (i.e., memory 11b), may be executed by a processor (i.e., processor 11a) to perform one or methods, including analyzing acoustic output of the sensor 10 on the basis of a pre-determined relationship between the acoustic output and the steam loss upstream of the sensor 10. In accordance with one embodiment, the computer-executable instruction may, when executed, cause the processor to determine whether the acoustic output at any point is indicative of an unacceptable level of upstream loss, in this case an unacceptable collective steam loss through steam traps 6a, 6b and/or 6c. If the acoustic output is indicative of an unacceptable level of upstream steam loss, the processor 11a may be configured to send a trigger signal to an alarm 15, which may be configured to generate an audible and/or visual alarm. Alternatively, the trigger signal might be used to generate a visual warning on a display device such as a VDU linked to the remote terminal.

The acoustic output of the sensor 10 may also be transmitted to the memory 11b for storage and retrieval at a later date.

It will be appreciated that the trigger signal can be used to prompt further investigation and, in certain embodiments, as a direct prompt for a full maintenance survey of those steam traps upstream of the sensor, in this case the three traps 6a, 6b and 6c.

It will further be appreciated that the trigger signal is generated on the basis of the acoustic output of only the single sensor 10, rather than a sensor on each of the steam traps 6a, 6b, 6c, so that in effect a plurality of steam traps can be effectively monitored, and maintenance surveys of the steam traps effectively scheduled, using only the single sensor 10.

In a typical condensate recovery system the number of steam traps far exceeds the number of receiver tanks Thus, although only three steam traps are shown in FIG. 1, there may be substantially more than this. For example, the single sensor 10 may respond to steam flow in a condensate return line 7 receiving condensate from more than 10, or perhaps more than 100, steam traps.

Thus, by positioning a sensor at an inlet of one or more receiver tanks, such as receiver tank 8, it is envisaged that a relatively small number of acoustic sensors can be used to monitor collective upstream steam loss through a relatively large number of steam traps. Nevertheless, it will be appreciated that even where each acoustic sensor is positioned along the condensate return line 7 downstream of only two steam traps, the number of sensors required to monitor the steam traps in accordance with embodiments of the present invention would be no more than half the number of actual steam traps, so that the steam traps are collectively monitored using only relatively few sensors.

On the other hand, increasing the number of sensors will increase the collective monitoring "resolution" of the sensors, because any trigger signal will only correspond to upstream steam loss, so that in principle a maintenance survey need only be scheduled for the steam traps upstream of the sensor that generated the trigger signal.

In general terms, it is envisaged that a balance can be struck between "monitoring resolution" and the numbers of acoustic sensors for a given application.

The acoustic sensor may be in the form of any suitable acoustic sensor, for example a piezo-electric acoustic sensor. Where, as in the case of acoustic sensor 10, the sensor may be clamped in position along the condensate return line, and in particular at the inlet of a receiver tank, it is envisaged that the associated relatively high operating temperatures (which may be as high as 250° C.) may require the sensor to be heat-shielded as appropriate.

Alternatively, where the sensor is being used to generate acoustic data only intermittently, the sensor may be moved into and out of position along the condensate return line as and when required, so as not to exceed the thermal rating of the sensor for any significant period of time.

The invention claimed is:

1. A condensate recovery system comprising:
    a plurality of drain lines for draining condensate from an associated steam plant, each drain line incorporating a steam trap and feeding into a common condensate return line running between at least two of the plurality of drain lines and a condensate receiver tank;
    an acoustic sensor positioned along the common condensate return line, upstream of the receiver tank, wherein the acoustic sensor is configured to provide an acoustic output indicative of a collective steam loss through a plurality of steam traps upstream of the sensor; and
    a processor configured to analyze the acoustic output of the acoustic sensor on the basis of a pre-determined relationship between the acoustic output and the combined amount of steam passing through the respective steam traps to determine a quantitative measure of actual steam loss from the system.

2. A condensate recovery system according to claim 1, wherein the system comprises a plurality of said acoustic sensors, each one of said sensors being positioned downstream from two or more of the steam traps.

3. A condensate recovery system according to claim 1, wherein the acoustic sensor is positioned downstream from all of the steam traps.

4. A condensate recovery system according to claim 2 wherein the acoustic sensor is positioned in proximity to an inlet of the condensate receiver tank.

5. A condensate recovery system according to claim 1, wherein the processor is a central processor configured to analyze the acoustic output of the acoustic sensor, wherein the acoustic sensor is operably connected to a transmitter for transmitting said acoustic output to a respective receiver operably connected to the central processor.

6. A condensate recovery system according to claim 1, further comprising a remote memory configured to store data derived from the acoustic output for subsequent retrieval and analysis, wherein the acoustic sensor is operably connected to a transmitter for transmitting said acoustic output to a respective receiver operably connected to the memory.

7. A method of monitoring steam loss in a condensate recovery system having a plurality of drain lines for draining condensate from an associated steam plant, each drain line incorporating a steam trap and feeding into a common condensate return line running between at least two of the plurality of drain lines and a condensate receiver tank, the method comprising:
    monitoring the acoustic output of at least two acoustic sensors upstream of a receiver tank and downstream from two or more of the steam traps wherein each acoustic sensor is configured to provide an acoustic output indicative of a collective steam loss through one or more steam traps upstream of the respective sensor; and;
    analyzing, with a processor, each acoustic sensor on the basis of a pre-determined relationship between the acoustic output of the acoustic sensor and the combined amount of steam passing through the respective steam traps to determine a quantitative measure of actual steam loss from the system.

8. A method according to claim 7, wherein monitoring the acoustic output of each acoustic sensor comprises transmitting the acoustic output of each of the acoustic sensors to a central processor and wherein analyzing the acoustic output comprises using said central processor to carry out an analysis of the acoustic output for each acoustic sensor on the basis of said pre-determined relationship.

9. A method according to claim 7, wherein the analysis of the acoustic output includes comparison of a value of a parameter of the acoustic output with a pre-determined maximum threshold value for that parameter determined on the basis of said pre-determined relationship.

10. A method according to claim 9, wherein said parameter is a spectral parameter.

11. A method according to claim 10, wherein generating an alarm signal if the value of the parameter exceeds the maximum threshold value for the parameter.

12. A non-transitory computer-readable medium comprising computer-executable instructions that when executed by a processor, cause the processor to perform:
    receiving an acoustic output from an acoustic sensor positioned along a common condensate return line operatively connected with a plurality of steam traps in a closed system and further located upstream of a receiver tank; and
    analyzing the acoustic output on a basis of a pre-determined relationship between the acoustic output and the combined amount of steam passing through the plurality of steam traps to determine a quantitative measure of collective steam loss through the plurality of steam traps.

13. The computer-readable medium of claim 12, wherein the acoustic sensor is a first acoustic sensor, and the computer-readable medium further comprising instructions that when executed by the processor cause the processor to perform:
    receiving an acoustic output from a second acoustic sensor operatively connected with a second plurality of steam traps of the closed system and further located upstream of a receiver tank;
    analyzing an acoustic output received from the first and a second acoustic sensors to determine a combined amount of steam passing through the first and the second plurality of steam traps in the closed system.

14. The computer-readable medium of claim 13, wherein the analyzing of the acoustic output for the first and the second acoustic sensor is performed at a central location.

15. The computer-readable medium of claim 12, wherein the analyzing of the acoustic output comprises instructions that when executed by the processor cause the processor to perform:
    comparing a value associated with a parameter of the acoustic output with a pre-determined maximum threshold value for that parameter determined on the basis of a predetermined relationship.

16. The computer-readable medium of claim 15, further comprising instructions that when executed by the processor cause the processor to perform:
    generating an alarm signal if the compared value of the parameter exceeds a maximum threshold value for the parameter.

17. The computer-readable medium of claim 12, wherein the parameter comprises a spectral parameter.

18. The computer-readable medium of claim 17, wherein the analyzing of the acoustic output comprises instructions that when executed by the processor cause the processor to perform:
    estimating from the raw acoustic data, a power spectral density value, wherein the power spectral density value is estimated from using Welch's Method, with a modified periodogram being calculated by applying a Hamming window to eight different segments of the respective acoustic signal, utilising a 50% overlap between individual segments.

* * * * *